(12) United States Patent
Hannington et al.

(10) Patent No.: US 9,547,109 B2
(45) Date of Patent: Jan. 17, 2017

(54) RETROREFLECTIVE ARTICLE

(75) Inventors: Michael Hannington, Madison, OH (US); Anita Juby, Garfield Heights, OH (US); Nikhil Agashe, Chicago, IL (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 12/868,666

(22) Filed: Aug. 25, 2010

(65) Prior Publication Data

US 2011/0211257 A1    Sep. 1, 2011

Related U.S. Application Data

(60) Provisional application No. 61/236,667, filed on Aug. 25, 2009.

(51) Int. Cl.
*G02B 5/124* (2006.01)

(52) U.S. Cl.
CPC .................................... *G02B 5/124* (2013.01)

(58) Field of Classification Search
CPC ............. G02B 7/28; G02B 5/12; G02B 5/122; G02B 5/124; G02B 5/136; E01F 9/042; E01F 9/083; B60Q 1/30; B60Q 1/132
USPC .......................................... 359/515, 529–547
See application file for complete search history.

(56) References Cited

U.S. PATENT DOCUMENTS

| | | | |
|---|---|---|---|
| 4,005,538 A | 2/1977 | Tung | |
| 4,200,875 A | 4/1980 | Galanos | |
| 4,634,220 A | 1/1987 | Hockert et al. | |
| 4,645,301 A | 2/1987 | Orensteen et al. | |
| 4,650,283 A | 3/1987 | Bradshaw et al. | |
| 4,668,894 A | 5/1987 | Barnett et al. | |
| 4,691,993 A | 9/1987 | Bradshaw et al. | |
| 4,708,920 A | 11/1987 | Bradshaw et al. | |
| 4,801,193 A | 1/1989 | Martin | |
| 4,972,061 A | 11/1990 | Duley et al. | |
| 5,122,902 A | 6/1992 | Benson | |
| 5,151,572 A | 9/1992 | Jack | |
| 5,169,707 A | 12/1992 | Bingham et al. | |
| 5,213,872 A | 5/1993 | Pricone et al. | |

(Continued)

FOREIGN PATENT DOCUMENTS

| EP | 1477368 | 11/2004 |
|---|---|---|
| EP | 1946157 | 11/2012 |

(Continued)

OTHER PUBLICATIONS

International Search Report dated Feb. 25, 2011 for International Application No. PCT/US2010/046709 filed Aug. 25, 2010.

(Continued)

*Primary Examiner* — Jennifer L. Doak
(74) *Attorney, Agent, or Firm* — Avery Dennison Corporation

(57) ABSTRACT

A retroreflective article includes a prismatic film having prismatic elements with a metallized coating wherein the metallized coating is laser etched to provide one or more light transmissive regions to expose underlying material that one or more provides high contrast images that contrast with the retroreflective film. The underlying material can include one or more contrasting elements. The article may be back-lighted to increase the contrast especially during conditions of reduced lighting.

20 Claims, 2 Drawing Sheets

(56) References Cited

U.S. PATENT DOCUMENTS

| | | |
|---|---|---|
| 5,264,063 A | 11/1993 | Martin |
| 5,542,202 A | 8/1996 | Brugger |
| 5,620,613 A | 4/1997 | Olsen et al. |
| 5,624,731 A * | 4/1997 | Desjardins .................... 428/143 |
| 5,708,109 A | 1/1998 | Bennett et al. |
| 5,815,292 A | 9/1998 | Walters |
| 5,885,677 A | 3/1999 | Gosselin et al. |
| 5,940,212 A | 8/1999 | Johnson et al. |
| 5,962,109 A | 10/1999 | Schwietz |
| 6,010,770 A | 1/2000 | Walters |
| 6,153,128 A | 11/2000 | Billingsley et al. |
| 6,155,689 A | 12/2000 | Smith |
| 6,168,876 B1 | 1/2001 | Thorp |
| 6,217,175 B1 | 4/2001 | Brown et al. |
| 6,288,842 B1 | 9/2001 | Florczak et al. |
| 6,484,637 B2 | 11/2002 | Lewis |
| 6,644,818 B2 | 11/2003 | Sloot |
| 6,767,609 B2 | 7/2004 | Aeling |
| 6,786,513 B1 | 9/2004 | Cobben et al. |
| 7,033,677 B2 | 4/2006 | Busch et al. |
| 7,034,688 B2 | 4/2006 | Cortina et al. |
| 7,445,347 B2 | 11/2008 | Couzin |
| 8,177,374 B2 | 5/2012 | Wu |
| 9,308,696 B2 | 4/2016 | Wu |
| 2002/0034608 A1 | 3/2002 | Aeling |
| 2003/0091815 A1 | 5/2003 | Buccellato et al. |
| 2005/0170164 A1 | 8/2005 | Christ et al. |
| 2005/0258637 A1 | 11/2005 | Bi et al. |
| 2007/0152834 A1* | 7/2007 | Mimura .................... 340/572.8 |
| 2008/0092418 A1 | 4/2008 | Peck et al. |
| 2008/0212181 A1 | 9/2008 | Wu |

FOREIGN PATENT DOCUMENTS

| | | |
|---|---|---|
| GB | 2433637 | 6/2007 |
| NL | 7804238 | 10/1979 |
| WO | 2004/104652 | 12/2004 |

OTHER PUBLICATIONS

Written Opinion dated Feb. 25, 2011 for International Application No. PCT/US2010/046709 filed Aug. 25, 2010.

* cited by examiner

RETROREFLECTIVE ARTICLE

CROSS-REFERENCE TO RELATED APPLICATION

The present application claims priority from U.S. Provisional Application No. 61/236,667 filed Aug. 25, 2009, which is incorporated herein by reference in its entirety.

FIELD OF THE INVENTION

This invention relates to the field of retroflective articles, and more particularly reflective articles having an image.

BACKGROUND OF THE INVENTION

The following prior art patent documents are made of record: U.S. Pat. Nos. 4,005,538; 4,200,875; 4,634,220; 4,645,301; 4,650,283; 4,688,894; 4,691,993; 4,708,920; 4,972,061; 5,122,902; 5,151,572; 5,169,707; 5,213,872; 5,542,202; 5,620,613; 5,815,292; 5,885,677; 5,940,212; 5,962,109; 6,010,770; 6,153,128; 6,155,689; 6,217,175; 6,288,842; 6,484,637; 6,644,818; 6,767,609; 6,786,513; 7,033,677; 7,034,688; 7,445,347; Publication No. US2002/0034608; Publication No. US2005/0258637; Publication No. US2008/0092418; Publication No. US/20080212181; EP Patent 1477368; and UK Patent Application 2433637.

It is known to provide a retroflective article having a protective layer over a prismatic film having cube corner prismatic elements, wherein the prismatic elements are coated with an opaque, vapor-deposited, aluminum coating. The aluminum coating is backed by a pressure sensitive adhesive layer which is backed by an interleaf such as an acrylic or polyester layer. A coating of a permanent type adhesive is adhered to the underside of the interleaf layer, and a release liner is adhered to the underlying permanent type adhesive. The underside of the protective layer may be preprinted with a repeating pattern such as a brick pattern, with a zone of pre-printing, such as with clear colored ink, and with reverse printing at the clear color printed zone. While the preprinting, the preprinted zone and the reverse printing at the printed zone are visible against the prismatic retroflective film, the amount of contrast between the pre-printing and the prismatic film was limited.

The reverse printing was a logo and/or text such as one indicating the source of the product. This reverse printing provided excellent contrast but had the limitation that only large amounts of material could be preprinted economically. Changes in design were also expensive and could not be done expediently.

What is needed therefore is an improved retroreflective article with having an image with an improved contrast and one which can be provided in an efficient and cost effective manner.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

A specific embodiment of the presently described invention provides a retroflective article that includes a light-transmissive protective layer, a retroflective film underlying which is adhered to the protective layer. The retroflective film includes a prismatic layer that has a plurality of retroreflective prism elements and a reflective metal coating on and conforming to the prismatic layer so that the film retroflects light. The metal coating, which is preferably opaque, includes a spacing layer underlying and adhered to the film. The spacing layer is in a range from transparent through translucent. An interleaf layer underlies and is adhered to the spacing layer. At least one etched region in the form of at least one image is provided through the metal coating to render the at least one region light transmissive.

At least one of the spacing layer and the interleaf layer includes one or more of the following contrast elements: a colorant, a color-shifting additive, a fluorescent additive, a phosphorescent additive and an infrared additive visible through the at least one etched region, with the contrast element(s) providing contrast with the retroflection from the retroflective film.

In a still further exemplary embodiment of the presently described invention, a retroflective article is provided that includes a light-transmissive protective layer, a retroflective film underlying and adhered to the protective layer. The retroflective film includes a prismatic layer that has a plurality of retroreflective prism elements and a reflective metal coating on and conforming to the prismatic layer so that the film retroflects light, with the metal coating being opaque. An underlying layer is adhered to the metal coating of the retroflective film, with the underlying layer including one or more of the following contrast elements: a colored adhesive, a colorant, a color-shifting additive, a fluorescent additive, a phosphorescent additive and an infrared additive, at least one etched region in the form of at least one image through the metal coating to render the at least one region light transmissive, and the contrast element(s) providing an image visible through the at least one etched region of the film that contrasts with the retroflection from the retroflective film.

In a yet still further exemplary embodiment of the presently described invention a retroflective article is provided that includes a first light-transmissive protective layer, a retroflective film underlying and adhered to the protective layer. The retroflective film including a prismatic layer has a plurality of retroreflective prism elements and a reflective metal coating on and conforming to the prismatic layer so that the film retroflects light, with the metal coating being opaque. A second light-transmissive protective layer on and conforms to the metal coating of the retroflective film, and at least one etched region in the form of at least one image through the metal coating to render the at least one region light transmissive, and a light source underlying the second protective layer and visible through the at least one etched region.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appre

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

Figure 1:
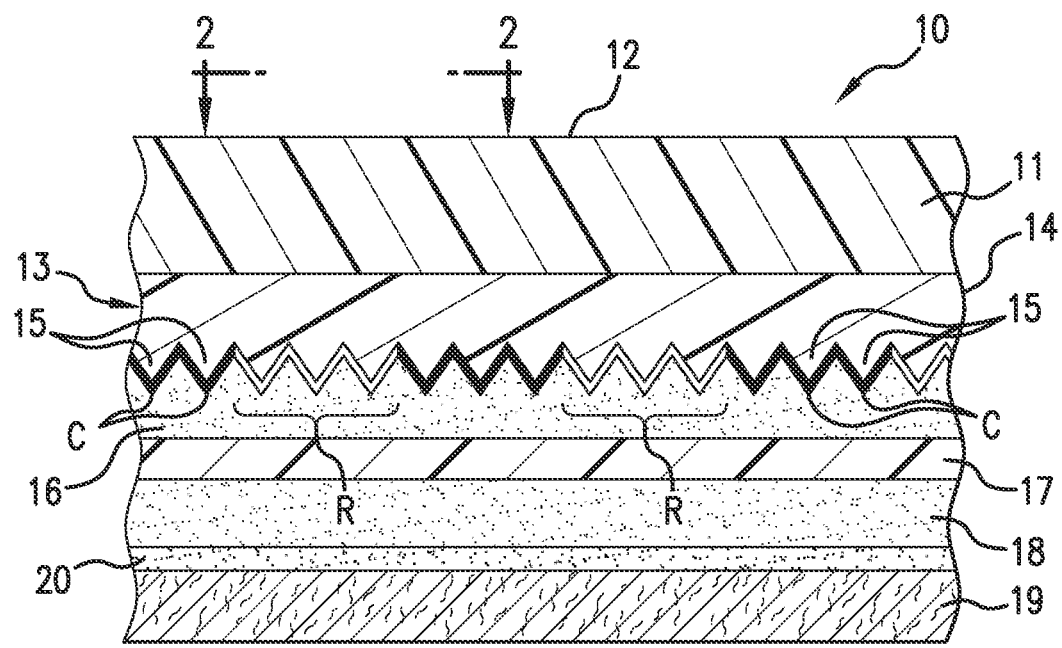
- FIG. 1 depicts a cross-sectional view of an embodiment of the retroreflective article in accordance with a disclosed embodiment.
Figure 2:
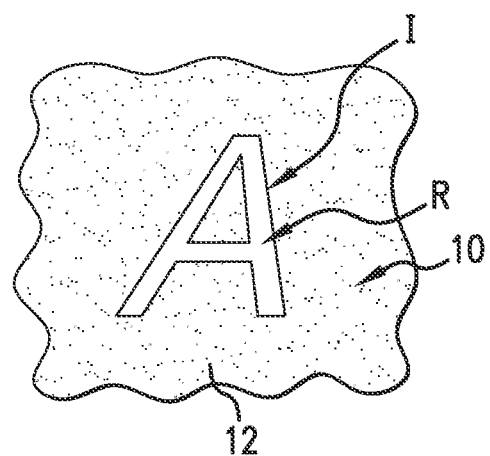
FIG. 2 is a top plan fragmentary view of the reflective article along line 2-2 of FIG. 1.

With reference to FIGS. 1 and 2 of the drawings, there is shown a retroreflective article generally indicated at 10. The article 10 can be made in wide webs and slit into narrow webs, if desired. Alternatively, a sheet fed process may also be used in connection with the manufacture of products described herein.

Narrow webs which have been cut into the desired lengths are typically used in variety of applications including the marking of automobiles, emergency vehicles, trucks, architectural structures, signage, advertising displays and the like. The article 10 is shown to have a "protective layer" which can protect against abrasion, dust, dirt, contaminants and the like. The layer 11 is preferably transparent and colorless, however, the layer 11 may be transparently colored, if desired. The layer 11 is comprised of a plastics material such as an acrylic but may be comprised of other suitable materials, for example a polycarbonate, polyolefins (linear or branched), polyamides, polystyrenes, nylon, polyesters, polyester copolymers, polyurethanes, polysulfones, polyvinylchloride, styrene-maleic anhydride copolymers, styrene-acrylonitrile copolymers, ionomers based on sodium or zinc salts of ethylene methacrylic acid, polymethyl methacrylates, cellulosics, fluoroplastics, acrylic polymers and copolymers, polyacrylonitriles, and ethylene-vinyl acetate copolymers. Included in this group are acrylates such as ethylene methacrylic acid, ethylene methyl acrylate, ethylene acrylic acid and ethylene ethyl acrylate.

In one embodiment, the first facestock can be polymeric facestock, which contains migratory additives. The facestocks are preferably polyvinylchloride facestocks, but other non-PVC based materials can be used. The additives can include plasticizers, antioxidants, thermal stabilizer, UV absorbers and the like.

The upper or outer surface 12 of the layer 11 is preferably smooth, although textures may be provided so as to increase the visual impact of the device. Underlying and adhered to the protective layer 11 is a plastic film generally indicated at 13 shown to include a prismatic layer 14 having a lower surface of prismatic elements 15 which may be referred to as "microprismatic elements". The layer 14 is preferably transparent and colorless, but can be transparently colored. Examples of typical retroreflective films or sheets are disclosed in U.S. Pat. Nos. 5,122,902; 6,155,689; and 7,445,347; and in Publication No. US2008/0212181. Publications, patents and patent applications are referred to throughout this disclosure. All references cited herein are hereby incorporated by reference.

The prismatic elements 15 are preferably made by embossing the layer 14 to provide cube corner prismatic elements, but can be cast or formed using other methods known to the art. For example, a sheet or web of thermoplastic material is fed to an embossing tool and heated to allow the pattern on the tool to be pressed into the acrylic material. The sheet or web is then cooled and collected. For an exemplary embossing process see U.S. Pat. No. 5,213,872 Pricone et al.

The prismatic layer 14 can be comprised of the same plastics material as the protective layer 11, namely, the prismatic layer 14 can be comprised of acrylic assuming the protective layer 11 is also comprised of an acrylic, or it can be comprised of a different plastic material, for example if the protective layer 11 is comprised of PVC then the prismatic layer 14 can be comprised of polycarbonate or acrylic. The retroreflective film 13 also includes a metallized or metal coating "C" comprised of a metal such as aluminum, but other suitable metals, for example, silver or chrome can be used. The metal coating C is preferably applied to the prismatic elements 15 of the prismatic layer 14 by vacuum metallizing, but the metal coating C can be applied by other methods such as sputtering, plasma coating and the like. The metal coating C adheres very well to the prismatic elements 15 and conforms to the surface provided by the prismatic elements 15. As shown in the drawings, the prismatic layer 14 underlies the protective layer 11 and the metal coating C underlies the prismatic elements 15. A layer 16 underlies, adheres to and conforms to the metal coating C. The layer 16 can also be deemed to be protective layer because it protects the metal coating C from direct exposure to the environment.

The metal coating C is preferably sealed off from ambient air and/or liquids which could degrade the metal coating C. The layer 16 is preferably comprised of an adhesive that adheres well to the metal coating C but can be any other suitable material such as those described as usable for layer 11 above. A suitable type of adhesive can preferably be a pressure sensitive adhesive or a heat activated adhesive. These include rubber based adhesives, acrylic adhesives, vinyl ether adhesives, silicone adhesives, and mixtures of two or more thereof. Included are the pressure sensitive adhesive materials described in "Adhesion and Bonding", *Encyclopedia of Polymer Science and Engineering*, Vol. 1, pages 476-546, Interscience Publishers, 2nd Ed. 1985, the disclosure of which is hereby incorporated herein by reference.

The pressure sensitive adhesive materials that are useful may contain as a major constituent an adhesive polymer such as acrylic type polymers, block copolymers, natural, reclaimed or styrene butadiene rubbers, tackified natural or synthetic rubbers, random copolymers of ethylene and vinyl acetate, ethylene-vinyl-acrylic terpolymers, polyisobutylene, poly (vinyl ether), etc. The pressure sensitive adhesive materials are typically characterized by glass transition temperatures in the range of about −70 degrees C. to about 10 degrees C.

The adhesive can be applied using known techniques. These include gravure, reverse gravure, offset gravure, roller coating, brushing, knife-over roll, metering rod, reverse roll coating, doctor knife, dipping, die coating, spraying, curtain coating, and the like.

In a preferred embodiment, another layer 17 comprised of a plastics material such as acrylic or polyester that underlies and adheres to the layer 16. An adhesive layer 18 underlies and adheres to the layer 17. A release liner 19 having a release coating 20 comprised, for example, of silicone underlies and is releasably adhered to the adhesive layer 18.

One or more regions R can be etched in the prismatic film 13. The etching is preferably done by a laser beam focused on the metal coating C. The preferred aiming of the laser beam is "head on", that is, essentially perpendicular to the upper surface 12 of the article 10. This head on direction of the laser beam provides for substantial vaporization or etching away of the metal coating C so as to render the metal coating C at regions R substantially light transmissive. For example, the laser beam can render the metal coating 50% light transmissive and 50% light retroreflective using the head on direction. The laser beam can alternatively be aimed at the article 10 at an oblique angle so that only a portion of each region R of the metal coating C is etched to provide a region R that can be seen only at particular angle. A type of laser that can be used for this purpose is a YAG pulse laser, but any suitable type of laser may be used.

The etching process enables the observer to see an underlying layer 16 or more than one layer, namely the layers 16 and 17 depending on the clarity of the layer 16. If the first layer 16 below any etched region R is other than opaque, then an underlying layer may be visible. In the event the layer 16 is opaque and is comprised of any material that differs in contrast from the unetched areas of the prismatic film 13, the observer will see an image I defined by the etched region R. The layer 16 can contain one or more contrast elements such as a colorant, a color-shifting additive, a UV fluorescent additive, a UV phosphorescent additive, and/or an infrared additive. If, for example, the layer 16 contains a white colorant such as titanium dioxide so as to render the layer 16 opaque, then only layer 16 will be visible. If the contrast element is a fluorescent or phosphorescent additive, the layer 16 and/or the layer 17 will glow when exposed to black light, or will be visible in the dark when the phosphorescent additive is used. If the contrast element includes a color-shifting additive, the image I will, for example, appear white when the article 10 is viewed head on, red if viewed at 45 degrees and green if viewed at 135 degrees.

If the layer 16 can transmit enough light, then the layer 17 will be visible. The layer 16 can be devoid of any such contrast element, and the visible layer 17 can have one or more of such contrast elements. For example, the layer 17 can be comprised of translucent or opaque white polyester.

One or more of such contrast elements can be distributed in or between the layers 16 and 17 in any combination that would be visible to the observer under the proper lighting conditions. For example, the layer 16 may be clear and contain an infrared additive, while the layer 17 may be colored, preferably of a light color such as white. One or more of such contrast elements can be readily incorporated into the layer 16 which is most preferably comprised of an adhesive.

By utilizing the layer 17, sometimes referred to as an "interleaf", the layer 16 can be tailored to be compatible with both the metal coating C and the layer 17. For example, the layer 16 can be comprised of adhesive, such as an adhesive of a tacky or pressure sensitive type having aggressive adherence to both the metal coating C and to the layer 17, and the adhesive 18 can be of the pressure sensitive type which is aggressive with respect to a surface or substrate to which the adhesive 18 is intended to be adhered. For example, a strip of the retroreflective article 10 can be adhered by means of the adhesive 18 to a truck that has a stainless steel surface or a painted or otherwise coated surface normally used for trucks. The adhesive 18 would, accordingly, be tailored to adhere well to such a truck surface.

If desired, the underside of the layer 11 can bear printing (not shown) such as a printed pattern and/or image which would not materially obstruct the image I visible through any etched region R or the printed pattern and/or image can be offset from the regions R. If that printed image is a logo or text, that image would be printed in reverse so as to be properly readable from above the article 10. In addition, a transparently colored background can be printed. Accordingly, the printing would be buried between the layers 11 and 14.

By an alternative construction, the layers 17 and 18 can be eliminated and the release liner 19 and its release coating 20 can be applied directly against the layer 16 which in this construction would be a pressure sensitive adhesive having good adherence with respect to the metal coating C and to the surface to which the article 10 is to be applied.

Figure 3:
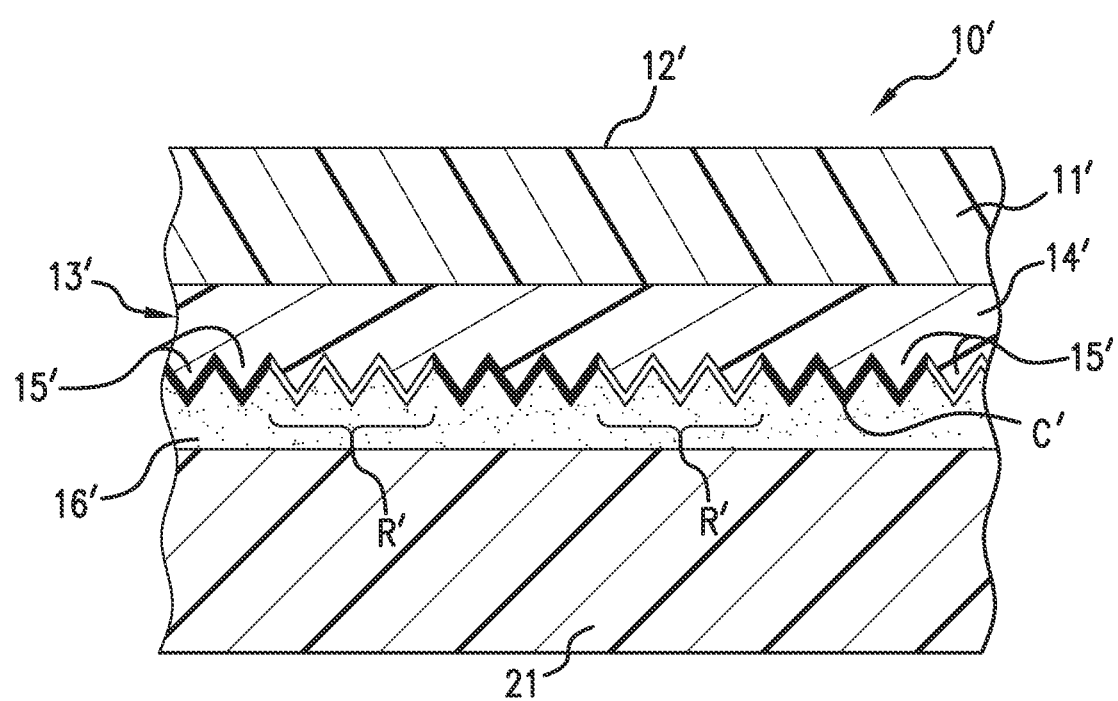
FIG. 3 is a cross-sectional view of another embodiment.

With reference to FIG. 3, an article 10' and its features are like those of the article 10, except as follows. Components having the same construction and purpose use the same reference character, but with a prime symbol. The article 10' is shown to have a light source 21 that underlies the layer 16' so that the article 10' is back-lighted. As illustrated, the layer 16' which is preferably a light-transmissive adhesive and can adhere directly to the metal coating C' of the film 13' and to the light source 21. The light source 21 can, for example, be a light-box or an electroluminescent panel. The back-lighted image(s) I would be visible through and defined by the etched region(s) R'. The article 10' could be sold without the panel 21, but with a release liner such as the release liner 20 would be releasably adhered to the adhesive 16'. The user can then strip away the release liner and adhere the article 10' to the light source by means of the adhesive 16'. In the above embodiments, by way of example, not limitation, suitable materials for the layers 16 and 16' are described above and suitable materials for the layer 17 can include the materials described as the protective layer 11.

If the article 10 or 10' is to carry preprinting, the web of protective layer 11 is preprinted as desired and the layer 11 or 11' is bonded by heat and pressure to the prismatic layer 14 or 14'. Alternatively layer 11 or 11' can be suitably bonded to layer 14 or 14" with other means known to the art such as a pressure sensitive or heat activated adhesive. The prismatic layer 14 or 14' can be coated, e.g., vacuum metallized, either before or after such bonding.

If no interleaf layer is used, preferably adhesive 16 or 16' is applied against the metal coating C or C' and a release liner 19 is laminated to the adhesive 16 or 16'. If an interleaf is used, then a web of interleaf material coated on both sides with adhesive is laminated to the metal coating C or C' of the prismatic film 13 or 13' before the release-coated liner 19 is applied. The resulting product is a flexible web that can be readily slit into narrow flexible webs. The etching can be performed thereafter. In fact, the etching can be done on a selected basis at pre-selected intervals along the length of the wide web or along a narrow flexible web. If the wide or narrow web carries buried printing, it may be desired to etch the web at such intervals or at greater intervals as to leave a high contrast, tell-tale or security feature visible through an occasional, etched region R or R'.

It will thus be seen according to the present invention a highly advantageous retroreflective article with etched image has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

What is claimed is:

1. A retroreflective article, comprising:
   a retroreflective film including a prismatic layer having a plurality of retroreflective prism elements and a reflective metal coating on and conforming to the prismatic layer so that the film retroreflects light, the metal coating being opaque;
   a spacing layer underlying and adhered to the film, the spacing layer being in a range from transparent through translucent;
   an interleaf layer underlying and adhered to the spacing layer;
   at least one etched region in the form of at least one image through the metal coating to render the at least one region light transmissive;
   at least one of the spacing layer and the interleaf layer including one or more of the following contrast elements: a colorant, a color-shifting additive, a fluorescent additive, a phosphorescent additive and an infrared additive visible through the at least one etched region, and the contrast eiernent(s) providing contrast with the unetched region of the metal coating;
   wherein the metal coating is between the spacing layer and the retroreflective prism elements.

2. A retroreflective article as defined in claim 1, wherein the spacing layer is transparent and the interleaf layer includes the contrast element(s).

3. A retrorefiective article as defined in claim 1, wherein the interleaf layer is translucent.

4. A retroreflective article as defined in claim 1, wherein the spacing layer is transparent and the interleaf layer is translucent through opaque and includes the contrasting element(s).

5. Aretroreflective article as defined in claim 1, wherein the spacing layer comprises an adhesive.

6. Aretroreflective article as defined in claim 1, wherein the colorant is white.

7. Aretroreflective article as defined in claim 1, wherein the interleaf layer is in a range from translucent through opaque.

8. A retroreflective article as defined in claim 7, wherein the spacing layer is translucent through opaque and the interleaf layer is in a range from translucent through opaque.

9. Aretroreflective article as defined in claim 1 including a light transmissive protective layer overlying and adhered to the retroreflective film.

10. A retroreflective article, comprising:
    a retroreflective film including a prismatic layer having a plurality of retroreflective prism elements and a reflective metal coating on and conforming to the prismatic layer so that the film retroreflects light, the metal coating being opaque;
    an underlying layer adhered to the metal coating of the retroreflective film, the underlying layer including one or more of the following contrast elements: a colored adhesive, a colorant, a color shifting additive, a fluorescent additive, a phosphorescent additive and an infrared additive;
    at least one etched region in the form of at least one image through the metal coating to render the at least one region light transmissive; and
    the contrast element(s) providing an image visible through the at least one etched region, and the contrast element(s) providing contrast with the unetched region of the metal coating;
    wherein the metal coating layer is between the underlying layer and the retroreflective prism elements.

11. Aretroreflective article as defined in claim 10, wherein the colorant is light in color.

12. Aretroreflective article as defined in claim 10, wherein the color of the adhesive is white.

13. Aretroreflective article as defined in claim 10 including a light transmissive protective layer overlying and adhered to the retroreflective film.

14. A retroreflective article, comprising:
    a retroreflective film including a prismatic layer having a plurality of retroreflectiveprism elements and a reflective metal coating on and conforming to the prismatic layer so that the film retroreflects light, the metal coating being opaque;
    a light-transmissive protective layer on and conforming to the metal coating of the retroreflective film;
    at least one etched region in the form of at least one image through the metal coating to render the at least one region light transmissive;
    a light source underlying the second protective layer and visible through the at least one etched regions; and
    one or more contrast elements between the retroreflective film and the light source, and the contrast elements including one or more of the following: a colorant, a color-shifting additive, a fluorescent additive, a phosphorescent additive and an infrared additive.

15. A retroreflective article as defined in claim 14, wherein the one or more contrast elements include one or more of the following: a fluorescent additive, a phosphorescent additive and an infrared additive.

16. Aretroreflective article as defined in claim 14, wherein the second light-transmissive layer comprises an adhesive.

17. A retroreflective article as defined in claim 14, wherein the second light-transmissive layer comprises and adhesive, and the adhesive containing one or more contrast elements in the adhesive, the contrast elements including one or more of the following: colorant, a color-shifting additive, a fluorescent additive, a phosphorescent additive and an infrared additive.

18. A retroreflective article as defined in claim 1, wherein the spacing layer is devoid of contrast elements and the interleaf layer comprises one or more contrast elements.

19. Aretroreflective article as defined in claim 1, wherein the spacing layer comprises an infrared additive.

20. Aretroreflective articles as defined in claim 19, wherein the interleaf layer is white.

* * * * *